March 1, 1966 R. L. MATTSON ETAL 3,237,475

GEARING

Filed May 24, 1962 2 Sheets-Sheet 1

INVENTORS
Raymond L. Mattson,
BY Howard E. Fonda, &
Donald E. Wente
Hugh L. Fisher
ATTORNEY

| TEETH | ORDER | APERIODIC SCHEME | CONTACT PATTERN SIZE |
|---|---|---|---|
| | 1 | 0 | MIN. + (0) Δ |
| | 2 | 2 | MIN. + (2) Δ |
| | 3 | 7 | MIN. + (7) Δ |
| | 4 | 3 | MIN. + (3) Δ |
| | 5 | 9 | MIN. + (9) Δ |
| | 6 | 5 | MIN. + (5) Δ |
| | 7 | 1 | MIN. + (1) Δ |
| | 8 | 8 | MIN. + (8) Δ |
| | 9 | 4 | MIN. + (4) Δ |
| | 10 | 6 | MIN. + (6) Δ |

INVENTORS
Raymond L. Mattson,
BY Howard E. Fonda, &
Donald E. Wente
Hugh L. Fisher
ATTORNEY United States Patent Office 3,237,475
Patented Mar. 1, 1966

3,237,475
GEARING
Raymond L. Mattson, Bloomfield Hills, Howard E. Fonda, Royal Oak, and Donald E. Wente, Fraser, Mich., assignors to General Motors Corporation, Detroit, Mich., a corporation of Delaware
Filed May 24, 1962, Ser. No. 197,329
17 Claims. (Cl. 74—457)

This invention relates to methods and gearing systems for controlling gear noise.

Any gearing is a potential source of objectionable noise. One instance of this occurs in passenger vehicles where the vehicle body becomes a sounding board for gear noises, particularly those emanating from the gearing in the rear axle and the transmission. To reduce these gear noises, complex dampener systems have been proposed and also attempts have been made to restrict manufacturing tolerances in an effort to approximate perfect gears. Both approaches are expensive and neither has offered an entirely satisfactory solution to the problem.

With the foregoing in mind, the invention contemplates a novel method whereby aperiodic variations are introduced into a gearing system so as to control the noise level of the gearing system. By the method, the contact patterns between certain ones of the engaging teeth on a pair of mating gears are caused to vary in an aperiodic fashion so as to reduce the noise level of the pair of gears. Also, the method contemplates varying the beginning and ending contact points between different engaging teeth on mating gears according to an aperiodic scheme. The novel method further contemplates varying the time intervals of the meshing events between different teeth on mating gears in an aperiodic way to thereby alter the noise level of the mating gears.

The invention additionally seeks to provide a gearing system in which mating gears are so formed and so arranged that the contact patterns of certain engaging teeth vary according to an aperiodic arrangement. More specifically, the invention contemplates altering the tooth face on certain of the gear teeth in accordance with an aperiodic scheme so that when the gear mates with another gear, the noise level of the mating gears is altered.

The foregoing and other objects and advantages of the invention will be apparent from the following description and from the following drawings in which.

Figure 1:
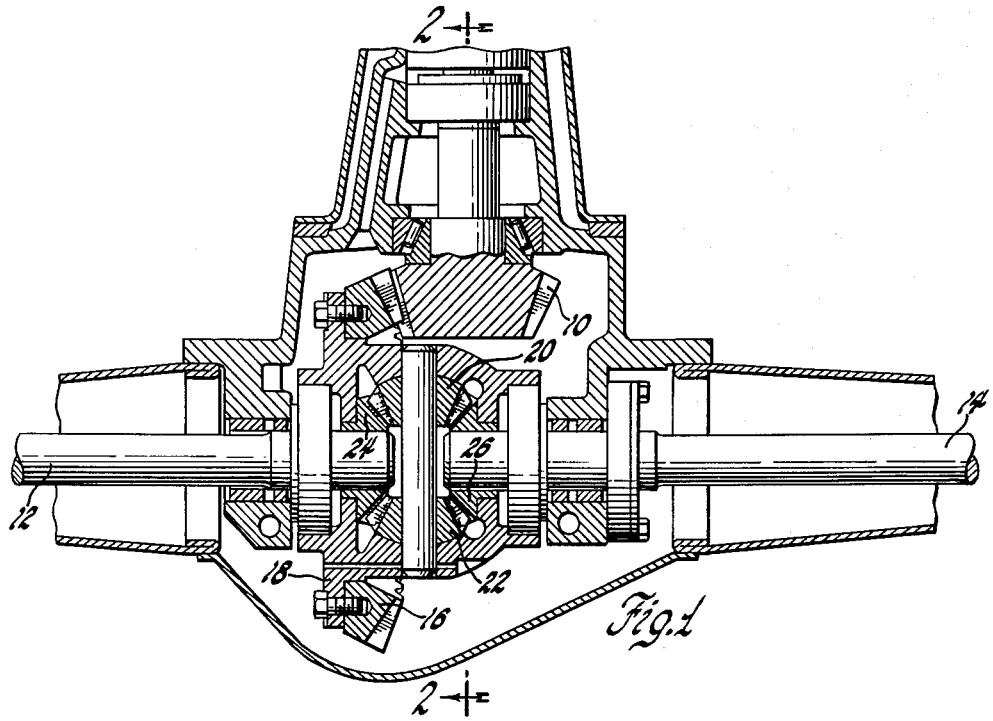
FIGURE 1 is a sectional view of motor vehicle rear axle gearing incorporating the principles of the invention.

Referring now to the drawings in detail, and initially to FIGURE 1, the rear axle gearing depicted is of the usual type and includes an input pinion gear 10 driven by a vehicle engine, not shown, and output axle shafts 12 and 14, each drive connected to one of the rear wheels, also not shown. The drive from the input pinion gear 10 to the axle shafts 12 and 14 is transferred by gearing comprising a ring gear 16 that mates with the pinion gear 10. The ring gear 16 has attached thereto a gear carrier 18 on which differential pinions 20 and 22 are journaled. These pinions 20 and 22 transfer drive to side gears 24 and 26, in turn drive connected, respectively, to the axle shafts 12 and 14. The differential action of this rear axle gearing is well known and will not be discussed in detail here, it being believed sufficient to explain that the wheels afford the reaction for rendering the gearing operative and that the wheels are permitted to revolve at different speeds as when the vehicle is making a turn.

Because the engagement between the pinion and ring gears 10 and 16 is a very substantial source of gear noise, the invention will be described as applied to these two gears. It should be understood, however, that the invention can be applied to any gearing system, as will become more apparent. Moreover, the pinion and ring gears 10 and 16 are assumed to be of the helical type usually employed in rear axles, e.g., as displayed in FIGURE 2.

Figure 2:
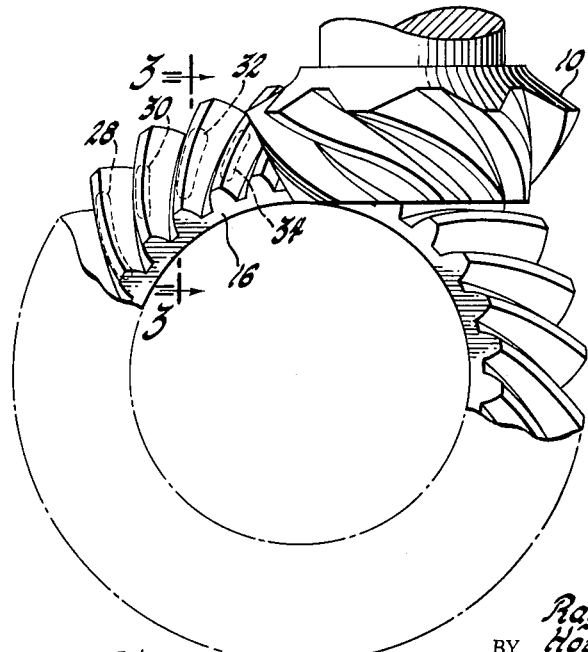
FIGURE 2 is a view of the ring and pinion gears employed by the FIGURE 1 rear axle gearing looking in the direction of arrows 2—2 of FIGURE 1.

It is known that the tooth meshing action of noisy pinion and ring gear sets initiates a consistent acoustic impulse that travels through the vehicle where it changes to an airborne vibration. This airborne vibration the passenger and the driver hear as a very disturbing whine. Furthermore, the tooth meshing action has been discovered to have a very definite relationship to the tooth contact pattern, which can be defined in various ways. For example, the contact pattern can be said to be the area of a particular tooth that is contacted by a mating tooth during a complete engagement extending from the point of beginning contact to the point of ending contact between the mating teeth. Contact pattern can also be described as that portion of the area of a tooth face that makes contact with a mating gear tooth during an engagement therewith. The contact pattern can be accurately and easily determined merely by painting the teeth on one of the gears with a substance that will wear off during a tooth engagement. The worn off part accurately depicts the contact pattern. A typical contact pattern 28 is shown in FIGURE 2 on the tooth of the ring gear 16.

Usually an effort is made to have this contact pattern 28 reproduced as closely as possible during every tooth engagement, i.e., the same contact pattern is to occur at the same location on each tooth face on either one of a pair of mating gears. This results in acoustic impulses that have substantially the same amplitude and that have a frequency determined by the speed at which the pinion gear 10 is driven. But by the invention, these contact patterns are altered so as to change the tooth meshing action and accordingly the noise from the gear set. This is accomplished, as will be explained, so that the contact patterns 28, 30, 32, and 34, illustrated in FIGURE 2, vary from tooth to tooth according to an aperiodic scheme, thus avoiding any uniformity of the acoustic impulses.

Figures 3, 4:
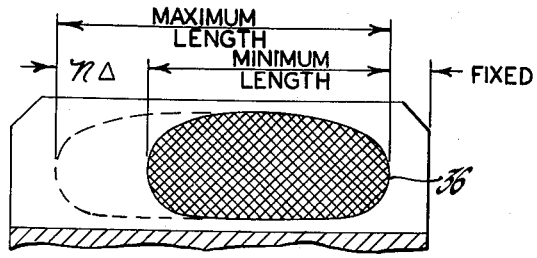
FIGURE 3 is a view of one of the ring gear teeth looking in the direction of arrows 3—3 in FIGURE 2.
FIGURE 4 is an aperiodic schedule for accomplishing the method of the invention when employing a ten-tooth gear.

This aperiodic scheme can best be described by referring to FIGURES 3 and 4. In carrying out the scheme, the minimum and maximum lengths of a contact pattern 36 are initially determined as shown in FIGURE 3. The maximum length will of course be determined by the face lengths of the two gears and the extent of each of the gear faces that are available. The minimum length is determined by the contact ratio, which should be selected so as to maintain a uniform velocity between the mating gears. Consequently, an actual overlap of tooth engagements is preferable and this requires a contact ratio that is greater than 1, e.g., 1.3.

In FIGURE 3, the contact pattern 36 is to be maintained a fixed distance from the one end of the tooth face and varied between the maximum and minimum length. Of course, this fixed amount can be varied so that the contact pattern 36 has a varying relationship with both edges of the teeth as portrayed in FIGURE 2.

If the contact pattern 36 is assumed to have the FIGURE 3 fixed end dimension, the contact pattern 36 is varied by the invention between the minimum and maximum lengths by an extent $n\Delta$, where $n$ varies, if, by way of example, a ten-tooth gear is employed, between zero and 9, and $$\Delta = \frac{\text{maximum length} - \text{minimum length}}{9}$$

Then, as illustrated in FIGURE 4, the ten teeth in the indicated order can have their contact pattern size varied according to the sequence in the column designated aperiodic scheme. With this aperiodic scheme, the actual contact pattern size for each tooth can be ascertained as indicated in the contact pattern size column. If $\Delta$ equals .040 of an inch, the contact pattern size would be varied accordingly and in general appear as shown on the teeth as numbered. With each contact pattern being different, and selected according to the aperiodic scheme, the time intervals between the points of beginning contact of adjacent teeth are varied. Again, it should be kept in mind that the points of ending contact also may be varied, or both the points of beginning contact and the points of ending contact may be varied.

The FIGURE 4 scheme produces full randomization, i.e., every tooth has a different contact pattern. In many applications, it may not be necessary to vary the contact pattern to this extent. If not, then only a few of the teeth need have their contact pattern altered, but still according to this aperiodic scheme. For example, every other tooth may have the contact pattern altered such that the altered teeth will each have a different contact pattern.

Those versed in the art will appreciate that the tooth contact pattern can be varied in many different ways. For instance, the involute can be changed, the point at which two teeth begin or end contact can be changed, or, if helical teeth are involved, helix angles can be altered. Also, the tooth spacing can be changed.

As will now be appreciated, the method described is accomplished without resort to complex dampener systems, which in themselves are usually not suited to a very wide frequency range, or without endeavoring to make gears that approach dimensional perfection, which is very costly. By the aperiodic scheme, the tooth contact patterns are varied so as to reduce the noise level to one that is no longer objectionable. The extent of the noise level reduction, necessarily, will be determined by the application of the gearing. In fact, the scheme may permit certain manufacturing tolerances to be relaxed.

The invention is to be limited only by the following claims.

We claim:

1. A method of controlling the noise produced by a gearing system having at least one pair of mating toothed gears comprising forming the gear teeth on the mating gears so that when the mating gears revolve the time intervals of the meshing events of certain engaging teeth are each different and vary aperiodically.

2. A method of controlling the noise produced by a gearing system having at least one pair of mating toothed gears comprising forming the gear teeth thereon so that as the mating gears revolve the tooth contact areas of certain meshing teeth are each different and vary aperiodically.

3. A method of controlling the noise produced by a gearing system having at least one pair of mating gears provided with helically arranged teeth thereon comprising forming the teeth on the mating gears so that when the mating gears revolve the tooth contact patterns of certain mating gear teeth are each different and vary aperiodically.

4. A method of controlling the noise produced by a gearing system having at least two mating toothed gears comprising forming the gear teeth on the mating gears so that when the gears revolve the time intervals between points of contact of certain of the mating gear teeth are each different and vary aperiodically thereby changing the level of noise produced by the gearing system.

5. A method of controlling the noise produced by a gearing system having at least two mating toothed gears comprising forming the gear teeth on the mating gears so that when the gears revolve the time intervals between points of beginning contact of certain of the mating gear teeth are each different and vary aperiodically thereby reducing the level of noise produced by the gearing system.

6. In combination, a pair of revolvably mounted and engaging toothed gears, the gears having the teeth thereon providing contact patterns such that when the gears revolve the time intervals of the meshing events of certain meshing teeth are each different and vary aperiodically thereby reducing the noise level of the pair of gears.

7. In combination, a pair of revolvably mounted and engaging toothed gears, the gears having the teeth thereon providing contact patterns such that when the gears revolve the contact patterns produced by certain ones of the engaging teeth are each different and vary aperiodically thereby changing the noise level of the pair of gears.

8. In combination, a pair of revolvably mounted and engaging toothed gears, the gears having the teeth thereon providing contact patterns such that when the gears revolve the points at which contact between certain engaging teeth begins are each different and vary aperiodically thereby changing the noise level of the pair of gears.

9. In combination, a pair of revolvably mounted and engaging toothed gears, the gears having the teeth thereon providing contact patterns such that when the gears revolve the points at which contact between certain engaging teeth ends are each different and vary aperiodically thereby changing the noise level from the pair of gears.

10. In combination, a pair of revolvably mounted and engaging toothed gears, the gears having the teeth thereon providing contact patterns such that when the gears revolve the time intervals of the meshing events between certain ones of the engaging teeth are each different and vary aperiodically thereby changing the noise level from the pair of gears.

11. A gear comprising a series of gear teeth, certain ones of the gear teeth provided with tooth contact areas that are each different and vary aperiodically having predetermined portions thereof.

12. A gear comprising a series of gear teeth, certain ones of the gear teeth having tooth contact areas that are each different and vary aperiodically.

13. A gear comprising a series of gear teeth, certain ones of the gear teeth having the faces thereof provided with tooth contact areas that are different and vary aperiodically.

14. In combination, toothed ring and pinion gears arranged to mate with each other, one of the gears having the teeth thereon provided with contact patterns such that when the gears revolve the tooth contact patterns of certain of the meshing teeth on the gears are each different and vary aperiodically thereby reducing the noise level of the gears.

15. In combination, tooth ring and pinion gears arranged to mate with each other, the ring gear having certain of the teeth thereon provided with tooth contact patterns such that when the gears revolve the tooth contact patterns of certain of the meshing teeth on the gears are each different and vary aperiodically thereby reducing the noise level of the mating gears.

16. In combination, toothed ring and pinion gears arranged to mate with each other, one of the gears having certain teeth thereof providing contact patterns that are each different and vary aperiodically to provide correspondingly varying tooth contact between the mating gears when revolved thereby changing the noise level of the mating gears.

17. In combination, toothed ring and pinion gears arranged to mate with each other, one of the gears having certain teeth thereon providing contact patterns that are each different and vary aperiodically so that the time intervals between points of contact of the mating teeth vary according to an aperiodic scheme when the gears revolve thereby reducing the noise level of the mating gears.

References Cited by the Examiner
UNITED STATES PATENTS

| | | | |
|---|---|---|---|
| 1,803,293 | 4/1931 | Bethune | 74—443 |
| 1,803,294 | 4/1931 | Bethune | 74—443 |
| 2,141,627 | 12/1938 | Street | 74—459.5 |
| 2,976,471 | 3/1961 | Harris | 74—435 X |

DON A. WAITE, *Examiner.*